(12) United States Patent
Menzel et al.

(10) Patent No.: US 7,892,325 B2
(45) Date of Patent: Feb. 22, 2011

(54) CONVERSION OF EXPLOSIVE GAS MIXTURES

(75) Inventors: Thomas Menzel, Pfeffingen (CH); Grigorios Kolios, Lörrach (DE); Monique Bissen, Mondsee (AT); Jürgen Johann, Nussloch (DE)

(73) Assignee: Christ Water Technology AG, Mondsee (AU)

( * ) Notice: Subject to any disclaimer, the term of this patent is extended or adjusted under 35 U.S.C. 154(b) by 228 days.

(21) Appl. No.: 12/300,750

(22) PCT Filed: May 11, 2007

(86) PCT No.: PCT/CH2007/000246

§ 371 (c)(1), (2), (4) Date: Nov. 13, 2008

(87) PCT Pub. No.: WO2007/131380

PCT Pub. Date: Nov. 22, 2007

(65) Prior Publication Data

US 2009/0120289 A1    May 14, 2009

(30) Foreign Application Priority Data

May 14, 2006    (CH)    .................................... 0777/06

(51) Int. Cl.
*B01D 19/00*    (2006.01)
(52) U.S. Cl. .............................. 95/172; 95/241; 95/254; 95/260; 95/266; 96/155; 96/188; 96/193; 96/204; 96/234; 422/177
(58) Field of Classification Search ................... 95/172, 95/241, 254, 260, 266; 96/155, 188, 193, 96/204, 234; 422/177
See application file for complete search history.

(56) References Cited

U.S. PATENT DOCUMENTS

2003/0077202 A1    4/2003    Furkasov et al.
2004/0223904 A1    11/2004    Haas et al.

FOREIGN PATENT DOCUMENTS

GB            939120        10/1963

OTHER PUBLICATIONS

International Search Report of PCT/CH2007/00246.

*Primary Examiner*—Duane Smith
*Assistant Examiner*—Tiffany N Palmer
(74) *Attorney, Agent, or Firm*—Thompson Coburn LLP

(57) ABSTRACT

A process for controlled conversion of at least two gases which form ignitable and/or explosive mixtures with one another, in which the gases are absorbed either separately or together in a carrier liquid which is inert in relation to the gases; the carrier liquid with the absorbed gases is fed to a degasser which comprises a closed degassing vessel (2) which comprises at least one feed line for the gas-laden carrier liquid (1) and at least one gas outlet (3) at its upper end, and also one or more drains for the carrier liquid below the feed line for the carrier liquid and in each case connected to a drain pipe (4), and in such a manner that the liquid flow rate in the degassing vessel (2) is less than 0.2 m/s, the gas mixture is removed from the carrier liquid in the degasser and, after leaving the degasser and optional drying, is reacted in a reaction zone; characterized in that the drain pipes (4) are designed as a closed riser line up to a height level between the exit cross section of the gas outlet from the degassing vessel (2) and the lowermost level of the reaction zone, and there is pressure equalization between gas outlet (3) and drain pipes (4) in this level region. Also described are suitable apparatus for performing the process and specific uses of the apparatus.

29 Claims, 2 Drawing Sheets

CONVERSION OF EXPLOSIVE GAS MIXTURES

Cross-Reference to Related Applications

Figure 1:
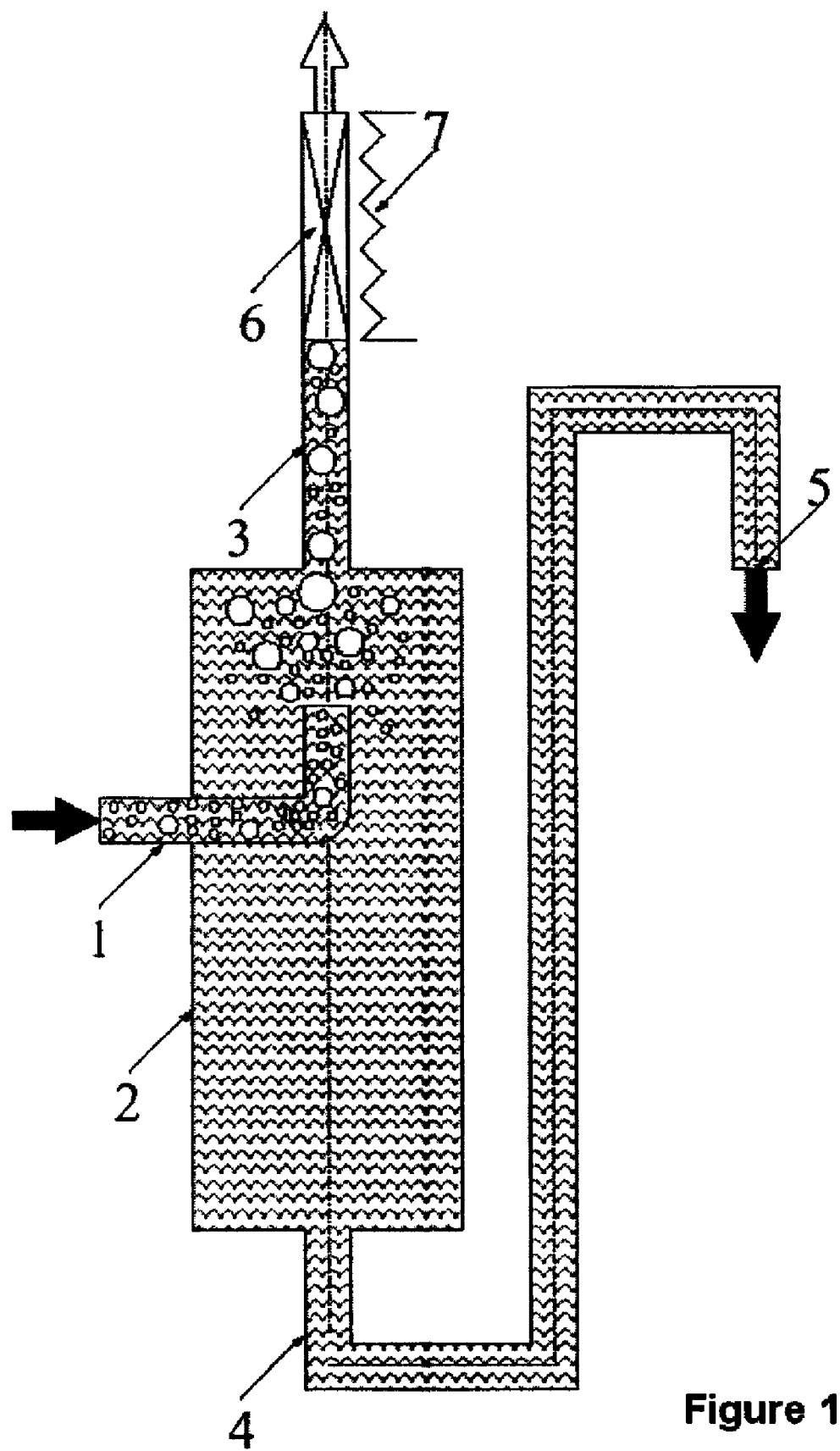

The present application claims the benefits of PCT/CH2007/000246, filed May 11, 2007, and Switzerland Application No. 777/06, filed May 14, 2006, both of which are entitled "Conversion Of Explosive Gas Mixtures" and are incorporated herein by reference in their entireties.

The present invention relates to the controlled conversion of ignitable and/or explosive gas mixtures, in particular a method for the controlled conversion of such gas mixtures, devices suitable for this purpose, and special uses of such devices.

When performing chemical processes, the problem often arises that gas mixtures are supposed to be reacted in a controlled manner, the conversion of which may result in the explosion of the mixture if certain critical parameters, such as for example composition, temperature, or geometry of the reaction space, are present.

In electrochemical processes performed in aqueous media for example, elemental hydrogen and oxygen are frequently produced at the electrodes by water cleavage, which often have a negative impact on the course of the reaction and therefore have to be removed. When operating electrode ionization modules for example, the hydrogen and oxygen gas constantly produced at the cathode and anode, respectively, would act as insulator between the electrodes and hence effectively interfere with the process. For this reason, it is necessary to constantly remove the gas formed on each electrode from the electrode surface, which generally occurs by rinsing the electrodes with an inert liquid such as water. For ecological and economic reasons, in practice, the rinsing of the electrodes typically does not occur separately but sequentially and with recirculation of the rinsing liquid. Consequently, a mixture of both gases dispersed in the liquid is present after rinsing, in approximately stoichiometric ratio, so that a highly explosive oxyhydrogen mixture is obtained during degassing of the carrier liquid necessary prior to recirculation of the rinsing liquid to the electrodes.

Since in practice, up to now, it has often been considered too dangerous to directly react the oxyhydrogen gas in order to render it harmless, according to the current state of the art, after degassing of the carrier liquid, for example a costly ventilation or dilution of the oxyhydrogen mixture with large quantities of inert gas has to be provided in order to avoid a critical accumulation of the oxyhydrogen mixture in the exhaust gas stream. These measures for a safe disposal of the gas significantly increase both the installation complexity and the operating expenses of such units.

However, problems similar to those in electrochemical processes also occur in other chemical processes, for example in the large-scale execution of oxidation reactions, such as partial oxidations, wherein explosive gas mixtures are often employed as educts.

It is therefore the object of the present invention to simplify a conversion of ignitable and/or explosive gas mixtures, in particular provide a method and a device that allow for a safe conversion of such gas mixtures in a simple and economic manner; thus for example allow the danger-free disposal of ignitable and/or explosive gas mixtures, which are obtained when performing chemical processes, with formation of chemically harmless compounds.

According to the invention, this object is solved by providing a method for the controlled conversion of at least two gases forming ignitable and/or explosive mixtures with one another, wherein the gases are absorbed either separately or together in a carrier liquid inert with respect to the gases; the carrier liquid with the absorbed gases is fed to a degasser comprising a closed degassing vessel (2) comprising at least one feed line for the gas-loaded carrier liquid (1) and at least one gas discharge outlet (3) at its top and one or more drains for the carrier liquid below the feed line(s) for the carrier liquid and a drain pipe (4) connected to each drain, and that in such a manner that the flow rate of the liquid in the degassing vessel (2) is less than 0.2 m/s, the gas mixture is separated from the carrier liquid in the degasser and, after exiting the degasser and optionally drying, is reacted in a reaction zone; characterized in that the drain pipes (4) are designed as a closed riser up to a height level between the exit cross section of the gas discharge outlet from the degassing vessel (2) and the lowest level of the reaction zone, and there is pressure compensation between gas discharge outlet (3) and drain pipes (4) in this level range.

Another aspect of the present invention is a device for the combined removal of at least two gases, which form ignitable and/or explosive mixtures with one another, from a carrier liquid inert with respect to the gases, and controlled reaction of these gases with one another, said device comprising a closed degassing vessel (2) comprising at least one feed line for the gas-loaded carrier liquid (1) and, at its top, at least one gas discharge outlet (3) connected to a reaction zone comprising an active ignition device for the gas mixture and/or a catalytically active zone (6) for converting the gases separated from the carrier liquid, and one or more drains for the carrier liquid below the feed line for the carrier liquid and a drain pipe (4) connected to each drain, characterized in that the drain pipes (4) are designed as a closed riser up to a height level between the exit cross section of the gas discharge outlet from the degassing vessel (2) and the lowest level of the reaction zone, and there is pressure compensation between gas discharge outlet (3) and drain pipes (4) in this level range.

As a result of the drain pipes (4) being designed as a closed riser up to a height level between the exit cross section of the gas discharge outlet from the degassing vessel (2) and the lowest level of the reaction zone, and pressure compensation between gas discharge outlet (3) and drain pipes (4) occurring at this position, in a simple and safe manner, it is avoided that a temporary or permanent explosive gas cushion is formed in the upper region of the degassing vessel (2), which, due to their operating principle, is an inherent feature of conventional degassers. Unexpectedly, it became apparent that explosions do not occur when such gas cushions in the degasser are avoided. Hence, according to the invention, explosions in the unit can be avoided even if a flashback of the flame front from the reaction zone does occur due to a sudden flow rate reduction of the exhaust gas.

Figure I shows an embodiment of the devices according to the present invention.

Figure II shows another embodiment of a device according to the invention having several exhaust pipes that form a tubular reactor later on.

According to the present invention, for example a stream of water as inert carrier liquid, which is loaded for example with a mixture of hydrogen and oxygen of ignitable and/or explosive stoichiometry, enters through feed line (1) into the degassing vessel (2). Therein, the oxyhydrogen mixture separates from the liquid and rises upwards into an exhaust pipe (3). In the exhaust pipe, initially, liquid that was carried along is removed in the lower region, and following this region, the desired chemical conversion of the gas is performed. In this embodiment, lastly, the exhaust pipe discharges the exhaust gas stream treated in this manner to the atmosphere. The degassed liquid flows downward out of the degassing vessel (2) and is passed through a rising pipe, which here for example is designed as siphon, as drain pipe (4). This pipe is in contact with the environment at its discharge point (5), which is at a level that is at least at the same height as the top of the degasser but lower than the lowest level of the reaction zone (6) in the gas discharge outlet (3). Via the environment, at the height of the discharge point (5) on the side of the drain, pressure compensation occurs with the gas discharge outlet (3), which is also open-ended to the environment, so that on the gas side, the same liquid level as in the drain pipe for the carrier liquid is reached, and neither formation of a gas cushion in the degasser nor flooding of the reaction zone takes place.

Pressure compensation between gas discharge outlet (3) and drain pipe (4) for the carrier liquid may also occur by means of a pressure-compensating line between gas discharge outlet (3) and drain pipes (4), for example when the device is to be operated with excess pressure. With the gas discharge outlet (3), this pressure-compensating line should be connected at a position that, on the gas side, is behind the reaction zone where the ignitable and/or explosive gas mixture is reacted, so that ignitable gas cannot get into the liquid discharge.

The effect of the degassing vessel (2) is largely based upon a calming of the flow of the gas-loaded carrier liquid, whereby an effective buoyancy movement of the gas bubbles is allowed. An empty container having a sufficiently large cross section may indeed also be used, however, fine bubble components having a bubble diameter of much less than 1 mm can only be separated poorly therewith. However, the effectiveness of the degasser may be significantly improved by fillings having a high specific surface. Such fillings may be for example a random packing of broken material, hollow cylinders, or spheres, for example made of ceramics, having a particle diameter of 0.1 mm to 10 mm that are inert with respect to the carrier liquid, or an ordered packing of crossed or corrugated structures made of stainless steel or a similar material, or a packing of stainless steel wire cloth having a wire diameter of 0.05 to 1 mm.

Preferably, the liquid flow rate in the degassing vessel (2) is even less than specified above, for example less than 0.1 m/s, preferably 0.05 m/s or lower.

Devices according to the invention may comprise, depending on requirements and gas loading, one or more feed lines for the gas-loaded carrier liquid (1), one or more gas discharge outlets (3), and one or more drains for the gas-free carrier liquid from the degassing vessel.

In the method or device according to the present invention, as already described above, one or more risers that are shaped as siphon are preferably used as drains (4), through which the essentially gas-free carrier liquid is led out of the degassing vessel (2), the discharge point to the atmosphere (5) of the mentioned drain(s) (4) being at the level of the top of degassing vessel (2) or higher.

The cross section of the discharge point should be selected in such a way that the dynamic pressure is negligible compared to the static pressure. According to the principle of the communicating vessels, it is thereby ensured that the degasser is always completely filled with liquid. Preferably, the flow-induced drop in pressure between feed inlet into the degassing vessel (2) and gas-side or liquid-side discharge point is less than 10 mbar, preferably less than 1 mbar.

In a special embodiment of the device according to the invention, the degassing vessel (2) and drain for the essentially gas-free carrier liquid have a concentric arrangement.

The ignitable and/or explosive gas mixtures separated in the degassing vessel (2) are preferably burnt in a controlled fashion, in particular with catalyst support. This may for example take place directly in a zone of the exhaust pipe (6) designed as tubular reactor, in which a suitable oxidation catalyst, for example based on Pt, Pd, Rh, Ag, or Cu, in the form of a fixed bed or a suitable coating of the inner surface of the tube is present. However, a prerequisite for the completion of the reaction is frequently maintaining an appropriate catalyst temperature. For this, the reactive gas mixture should be as dry as possible. If necessary, the catalytically active reaction zone (6) must in addition be maintained at the required temperature level by means of heat tracing. In case of a highly exothermic reaction in the reaction zone (6), however, the opposite situation may also arise, that is the reaction zone has to be cooled.

If a tubular reactor designed in this manner is expertly constructed, it provides optimal conditions for a controlled conversion process, in particular a sufficiently high flow rate. In addition, for example by means of a suitably selected tube geometry, the quantity of ignitable gas in the reaction space may be kept so low that even the effects of an occasionally occurring deflagration in the pipe remain harmless.

Thus, in a preferred embodiment of the method according to the invention, the separated gas mixture passes through a catalytically active zone (6) in the exhaust pipe and is catalytically reacted there. The gas discharge outlet consists here for example of one or more exhaust pipes (3), each of which comprise a catalytically active zone (6) and before it, in direct continuation of the degasser, a catalytically inert zone, since in the buoyancy flow of the gas bubbles, liquid is usually carried along into the exhaust pipe as well, so that the liquid level therein is frequently actually above the top of the degassing vessel.

Although the mentioned catalytically inert zone in the exhaust pipes may simply be empty, it preferably contains a gas-permeable solid filling acting as droplet separator for the separated gas mixture. The gas mixture is subjected to a drying herein. In addition, the zone of the exhaust pipes left empty or preferably filled with a suitable solid filling for droplet separation forms a suitable flame barrier, which additionally impedes spreading of a combustion zone into the degassing vessel.

Solid fillings suitable for droplet separation comprise for example a random packing of particles made of inorganic material, for example broken material, hollow cylinders, or spheres made of ceramic material, such as for example alpha-$Al_2O_3$, cordierite, mullite, or steatite, etc., having a particle diameter of 0.1 mm to 10 mm; an ordered packing of crossed or corrugated structures made of stainless steel or similar material; or a packing of stainless steel wire cloth having a wire diameter of 0.05 mm to 1 mm, the effectiveness increasing in this order.

As already explained above, the method according to the invention may very well be used for the controlled reaction of oxyhydrogen mixtures; in a preferred embodiment of the method according to the invention, the gases to be converted are therefore hydrogen and oxygen, which are present in an ignitable and/or explosive stoichiometric ratio.

For their conversion, a catalyst such as for example Pt, Pd, Rh, Ag, or Cu, in particular Pt, is preferably used in a manner known per se in the catalytically active zone (6). This may for example occur by using gas discharge outlet pipes consisting at least in the region of the catalytically active zone (6) of stainless steel coated on the inside with a catalyst as specified above, in particular with Pt. However, a packing of filler material containing one of the specified catalysts may also be used in the catalytically active zone (6) of the gas discharge outlet, preferably a random packing of filler material coated with one of the precious metals specified, most preferably with platinum, in particular spheres, solid or hollow cylinders having a diameter of 0.1 to 10 mm, for example made of ceramic material, such as aluminum oxide or a similar material, or with films of stainless steel coated in the manner specified.

In the region of the catalytically active zone (6), the devices according to the present invention preferably comprise a device for thermostatting (7) this zone, i.e. for the cooling and/or heating thereof, in order to further control the catalytic reaction proceeding in the zone.

The geometry of an exhaust pipe of the devices according to the invention and the dwell time of the gases in the catalytically active zone (6) should generally be selected in such a way that in the catalytically active region of the exhaust pipe: the pipe inner diameter is less than 30 mm, preferably less than 12 mm, and the wall thickness of the pipe is less than 10 mm, preferably less than 2 mm, and the dwell time of the gas stream in the catalytically active zone is 0.01 to 10 seconds, preferably 0.1 to 1 second. The flow rate of the carrier liquid should be in the range specified above; the same applies to the flow-induced drop in pressure between feed inlet and gas-side or liquid-side discharge point.

Figure 2:
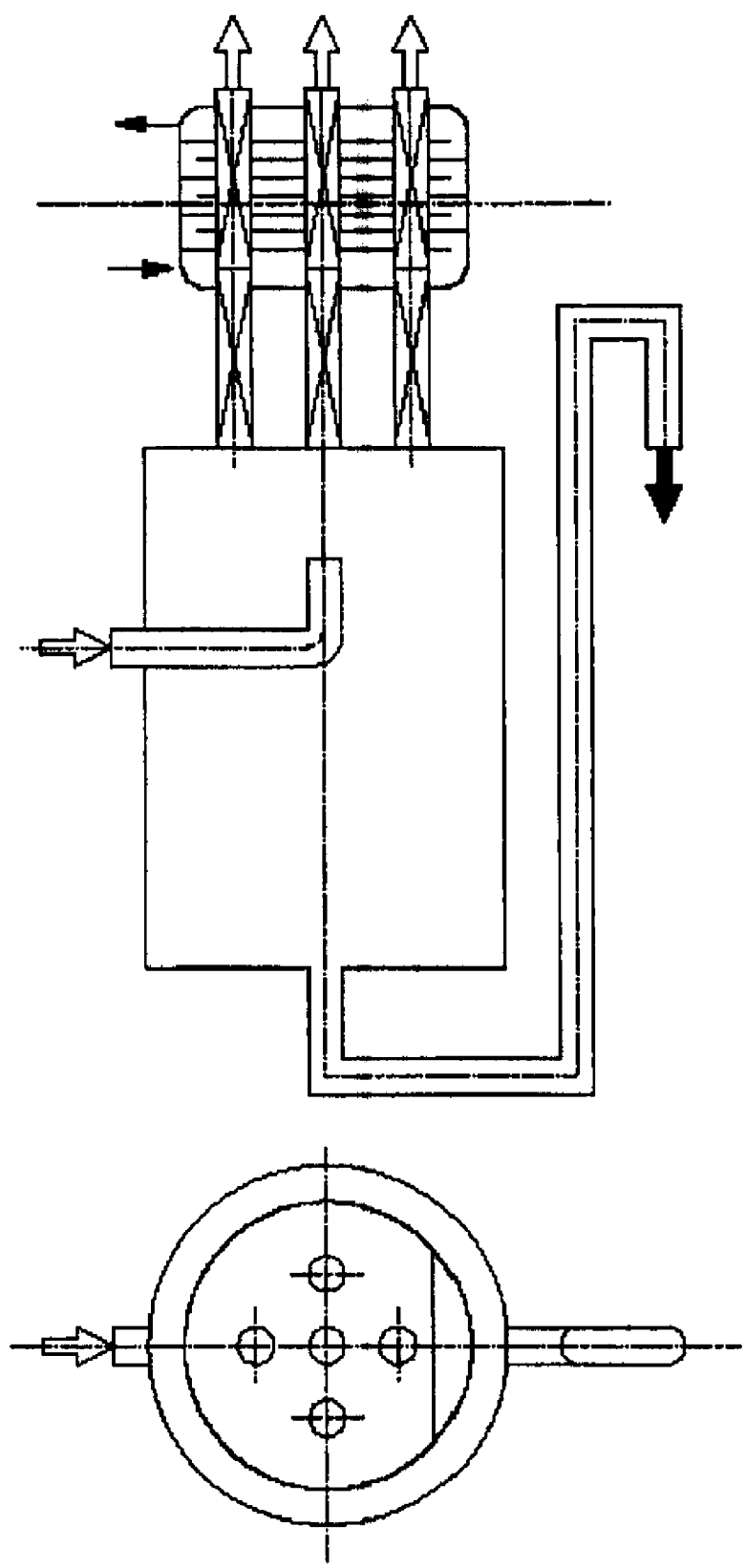

A special embodiment of the device according to the invention has several gas discharge outlets jointly leading into a tube bundle reactor, which preferably is thermostattable, for example by means of a liquid heat carrier, which is passed by the reactor pipes externally and may optionally cool and/or heat them, as schematically shown in FIG. 2.

In a special embodiment of the method according to the invention, the essentially gas-free carrier liquid is returned or recycled to absorb further gas, which is particularly economical in particular when disposing of explosive byproducts or waste products of chemical processes.

The method according to the invention and the devices according to the invention may be employed anywhere where ignitable and/or explosive gas mixtures have to be converted in a controlled manner, for example for degassing the concentrate of electrode ionization modules or for mixing and subsequent conversion of ignitable and/or explosive mixtures of gases. Another field of application is steam generators, in particular steam generators for superclean steam, in which ultrahigh-purity hydrogen is reacted with ultrahigh-purity oxygen.

The invention claimed is:

1. A method for the controlled conversion of at least two gases forming ignitable and/or explosive mixtures with one another, wherein the gases are absorbed either separately or together in a carrier liquid inert with respect to the gases;
the carrier liquid with the absorbed gases is fed to a degasser comprising a degassing vessel (2) comprising at least one feed line for the gas-loaded carrier liquid (1) and at least one gas discharge outlet (3) at its top and one or more drains for the carrier liquid below the feed line for the carrier liquid and a drain pipe (4) connected to each drain, and that in such a manner that the flow rate of the liquid in the degassing vessel (2) is less than 0.2 m/s, the gas mixture is separated from the carrier liquid in the degasser and, after exiting the degasser and optionally drying, is reacted in a reaction zone;
characterized in that
the drain pipes (4) are designed as a closed riser up to a height level between the exit cross section of the gas discharge outlet from the degassing vessel (2) and the lowest level of the reaction zone, and there is pressure compensation between gas discharge outlet (3) and drain pipes (4) in this level range.

2. The method according to claim 1, characterized in that the essentially gas-free carrier liquid is passed through siphon-shaped risers as drains (4), the discharge point to the atmosphere (5) of which is at the level of the top of the degassing vessel (2) or higher.

3. The method according to claim 1, characterized in that the separated gas mixture is burnt in a controlled manner, optionally with catalyst support.

4. The method according to claim 1, characterized in that the separated gas mixture passes through a catalytically active zone (6) and is catalytically reacted there.

5. The method according claim 1, characterized in that the separated gas mixture is subjected to droplet separation for drying, which immediately follows the exit of the gas mixture from the degassing vessel.

6. The method according to claim 5, characterized in that for droplet separation, the part of the gas discharge outlet immediately following the exit of the gas discharge outlet (3) from the degassing vessel (2) is used, which is either empty or preferably filled with a solid filling suitable for droplet separation.

7. The method according to claim 6, characterized in that the solid filling consists of a random packing of particles made of inorganic material having a particle diameter of 0.1 mm to 10 mm, an ordered packing of crossed or corrugated structures made of stainless steel, or a packing of stainless steel wire cloth having a wire diameter of 0.5 mm to 1 mm.

8. The method according to claim 4, characterized in that the liquid flow rate in the degassing vessel (2) is less than 0.1 m/s, preferably 0.05 m/s or lower.

9. The method according to claim 1, characterized in that the flow-induced drop in pressure between feed inlet into the degassing vessel (2) and gas-side or liquid-side discharge point is less than 10 mbar, preferably less than 1 mbar.

10. The method according to claim 4, characterized in that the dwell time of the gas stream in the catalytically active zone (6) is 0.01 to 10 seconds, preferably 0.1 to 1 second.

11. The method according to claim 1, characterized in that the at least two gases are hydrogen and oxygen, which are present in an ignitable and/or explosive stoichiometric ratio.

12. The method according to claim 4, characterized in that in the catalytically active zone (6), a catalyst such as Pt, Pd, Rh, Ag, or Cu is used in order to react the mixture of hydrogen and oxygen.

13. The method according to claim 12, characterized in that as catalytically active zone (6), stainless steel pipes, which are coated with a catalyst such as Pt, Pd, Rh, Ag, or Cu on the inside, in the gas discharge outlet are used.

14. The method according to claim 12, characterized in that as catalytically active zone (6), a packing of filler material, which contains a catalyst such as Pt, Pd, Rh, Ag, or Cu, in the gas discharge outlet is used.

15. The method according to claim 14, characterized in that the packing consists of a random packing of filler material coated with Pt, Pd, Rh, Ag, or Cu, in particular spheres, solid or hollow cylinders having a diameter of 0.1 to 10 mm; or films made of stainless steel coated with Pt, Pd, Rh, Ag, or Cu.

16. The method according to claim 1, characterized in that the essentially gas-free carrier liquid is returned or recycled for absorption of further gas.

17. A device for the combined removal of at least two gases, which form ignitable and/or explosive mixtures with one another, from a carrier liquid inert with respect to the gases, and controlled reaction of these gases with one another comprising:

a closed degassing vessel (2) comprising at least one feed line for the gas-loaded carrier liquid (1) and, at its top, at least one gas discharge outlet (3) connected to a reaction zone comprising an ignition device for the gas mixture and/or a catalytically active zone (6) for converting the gases separated from the carrier liquid, and one or more drains for the carrier liquid below the feed line for the carrier liquid and a drain pipe (4) connected to each drain, characterized in that the drain pipes (4) are designed as a closed riser up to a height level between the exit cross section of the gas discharge outlet from the degassing vessel (2) and the lowest level of the reaction zone, and there is pressure compensation between gas discharge outlet (3) and drain pipes (4) in this level range.

18. The device according to claim 17, characterized in that it has siphon-shaped risers as drains (4), the discharge point to the atmosphere (5) of which is at the level of the top of the degassing vessel (2) or higher.

19. The device according to claim 17, characterized in that the degassing vessel (2) and the drain for the essentially gas-free carrier liquid have a concentric arrangement.

20. The device according to claim 17, characterized in that the gas discharge outlet consists of one or more exhaust pipes (3), each comprising a catalytically active zone (6) and before it, immediately following the degasser, a catalytically inert zone.

21. The device according to claim 20, characterized in that the catalytically inert zone in the exhaust pipes contains a gas-permeable solid filling acting as droplet separator for the separated gas mixture.

22. The device according to claim 20, characterized in that the catalytically active zone (6) contains a Pt, Pd, Rh, Ag, or Cu catalyst.

23. The device according to claim 22, characterized in that the catalyst consists of a random packing of filler material coated with catalyst, in particular spheres, solid or hollow cylinders having a diameter of 0.1 to 10 mm, or a film made of stainless steel coated with catalyst.

24. The device according to claim 23, characterized in that the catalytically active zone (6) of an exhaust pipe consists of a stainless steel pipe, the inner surface of which is coated with Pt, Pd, Rh, Ag, or Cu.

25. The device according to claim 20, characterized in that it comprises a device for thermostatting (7) in the region of the catalytically active zone (6).

26. The device according to claim 17, characterized in that the degassing vessel (2) comprises internals and/or a filling having a high specific surface.

27. The device according to claim 17 for degassing the concentrate of electrode ionization modules.

28. The device according to claim 17 for mixing and subsequent conversion of ignitable and/or explosive mixtures of gases.

29. A steam generator, in particular a steam generator for superclean steam according to claim 17.

* * * * *

UNITED STATES PATENT AND TRADEMARK OFFICE
CERTIFICATE OF CORRECTION

| | | |
|---|---|---|
| PATENT NO. | : 7,892,325 B2 | Page 1 of 1 |
| APPLICATION NO. | : 12/300750 | |
| DATED | : February 22, 2011 | |
| INVENTOR(S) | : Menzel et al. | |

It is certified that error appears in the above-identified patent and that said Letters Patent is hereby corrected as shown below:

On the Title Page:
Item (73) is corrected to read:

(73) Assignee: Christ Water Technology AG, Mondsee (AT)

Signed and Sealed this
Fifth Day of April, 2011

David J. Kappos
*Director of the United States Patent and Trademark Office*